Patented June 1, 1948

2,442,502

UNITED STATES PATENT OFFICE 2,442,502

PREPARATION OF LACTIC-ACID BACTERIA

Erik Gunnar Mejlbo, Charlottenlund, Denmark, assignor to A/S Enico, Copenhagen, Denmark No Drawing. Application February 11, 1946, Serial No. 646,954. In Denmark May 19, 1941

6 Claims. (Cl. 195—59)

It is known to produce a preparation of lactic-acid bacteria by centrifuging a milk- or meat-soup-culture of a lactic-acid bacterium having therapeutic qualities, particularly *Lactobacillus acidophilus*, and mixing the resulting concentrate of bacteria with a carrying substance. By the known method of this kind the carrying substance consists of an emulsion of water in paraffin-oil, the bacteria concentrate being distributed at the watery phase by means of a stabilizing agent contained therein.

During the experiments in trying to give such a concentrate of therapeutic active lactic-acid bacteria, *Lactobacillus acidophilus* in particular, cultivated on a milk-substratum a widened field of application, in such a way that it is not tied to the paraffin-oil emulsions mentioned, it appeared however, that owing to the lactic-acid formation occuring during the cultivation an amount of casein is separated together with the bacteria-concentrate, resulting in difficulties in obtaining a stable suspension, as the casein is insoluble in water. The presence of casein results also in a reduction of the durability of the preparations produced.

The present invention has for its object to avoid this disadvantage and this is obtained by the milk-substratum culture of the said lactic-acid bacteria being adjusted to a pH-value of approximately 4.2–4.3 and is then being freed from casein separated for instance by leaving it and decanting, by filtration or by centrifuging. From the culture thus released of the casein the bacteria are concentrated by centrifuging.

This concentrate of lactic-acid bacteria is easily stirred up into or distributed in a carrying medium, in which it is possible to obtain a very high concentration of the micro-organisms for example more than one billion bacteria per cm³. If the carrying medium is water or an aqueous solution impassive to the bacteria, as for instance a physiological sodium chloride solution, no lactic-acid will form for which reason the preparation even at ordinary temperature has a comparatively good durability. This is also the case even if the carrying-medium is a fermentable substance in itself, as at ordinary temperature no substantial lactic-acid formation will set in. As a carrying medium the following substances may thus be applied: milk, chocolate, ice-cream, cream-caramels, chewing-gum, soda water, beer, honey, clotted cream or many other substances.

A method of producing an acidophilus preparation by cultivating the bacteria in milk by which method a separation of casein and bacteria is aimed at is previously known.

According to this method however the casein is contrary to the present way of procedure precipitated prior to the admixture of the bacteria to the milk the casein particles during the inoculating being suspended in the fluid. When the cultivation ceases the fluid is agitated in a brisk manner in order to liberate the bacteria from the casein particles, whereupon firstly the casein, secondly the bacteria are separated from the whey. This method however has various disadvantages. In the first place the possibilities of development of the bacteria will be inferior to the possibilities in the present case in a considerable degree, partly for pure nutrious reasons and partly because bacteria always develop better in an entirely fluid substratum. For the second a far greater number of bacteria will be lost together with the casein as these by inoculating in precoagulated milk necessarily will penetrate the larger coagula from which they can not or only to a small extent may be separated by means of the previously mentioned stirring up of the fluid.

The preparation according to the invention is produced in a manner known per se from original cultures which are re-sown at suitable intervals and before use in a manner likewise known per se are revived in that one or more generations are cultivated under appropriate favourable conditions. From the original-culture revived, a number of pre-cultures are sown in a suitable sacchariferous nutritive fluid, deriving from these a new batch of pre-cultures are sown.

It is important that the second batch of pre-cultures by a suitable selection of concentration, and of the quantity of the pre-culture of the first batch used for the sowing becomes as acid as possible within 24 hours, as the growth hereby reaches its optimum in the main portion.

For the preparation of this a milk-substratum is used for example sterile skim-milk and by the cultivation care is taken in accordance with the above mentioned method that the casein is precipitated and removed before the bacteria are being concentrated by centrifuging.

According to the invention it has been found that to obtain a bacteria-concentrate as pure as possible, and out of which may be produced very concentrated suspensions, it is preferable to dilute the culture with water after the bacteria have reached the suitable state of development, and before the culture is adjusted to the reaction prevailing during the separation of casein. According to the invention the dilution may adequately amount to 5.5–6 times.

As an example of the making of the preparation according to the present invention the following may be mentioned.

Sterile skim-milk is inoculated with a suitable number of say batch two pre-cultures of the lactic-acid bacterium in question and left for 24 hours at a temperature of say 38 degrees centigrade. After this period the culture is diluted with approximately 4.5–5.0 parts of sterile water and adjusted to a pH-value of approximately 4.2–4.3 for instance through applying sterile hydrochloric acid, provided it did not previously possess this pH-value. The fluid may then be left and when the casein has precipitated the bacterious liquid may be decanted. The separation however may also take place by means of centrifuging or by filtration under such circumstances that the bacteria are not retained.

The bacterial liquid is then subjected to centrifuging by which means the bacteria become concentrated. To this end the liquid may continuously pass through a centrifuge running 17,000 revolutions. By a centrifuge of ordinary size running this number of revolutions, 250–300 litres of liquid per hour for instance may run through, thereby depositing the bacteria in form of a light-yellow plastic coating, which may readily be stirred up with the carrying-medium and distributed therein by shaking.

The present invention also includes a preparation of lactic-acid bacteria, Lactobacillus acidophilus preferably, either in form of a concentrate or in form of a concentrate suspended in a carrying medium produced essentially as described above.

The invention is not limited to the details herein described. The method may be varied in many ways, thereby not getting beyond the limits of the invention.

I claim:

1. A method of producing a preparation of lactic-acid bacteria not containing casein by centrifuging a pure culture of the said lactic-acid bacteria cultivated on a milk-substratum, characterized in that the culture in the milk-substratum after having been developed to a maximum is adjusted to a pH-value of approximately 4.2–4.3, and the casein that has separated out is removed therefrom, after which the bacteria culture thus freed of casein is subjected to centrifuging in order to concentrate the bacteria content.

2. A method according to claim 1, characterized in that the lactic-acid bacteria is Lactobacillus acidophilus.

3. A method according to claim 1, characterized in that the substratum is diluted with water prior to being adjusted to the said pH-value.

4. A method according to claim 1, characterized in that the substratum is diluted with approximately 4.5–5.0 parts of water prior to being adjusted to the said pH-value.

5. A method of producing a preparation of lactic-acid bacteria not containing casein by centrifuging a pure culture of the said lactic-acid bacteria cultivated on a milk-substratum, characterized in that the culture in the milk-substratum after having been developed to a maximum is adjusted to a pH-value of approximately 4.2–4.3, and the casein that has separated out is removed therefrom, after which the bacteria culture thus freed of casein is subjected to centrifuging in order to concentrate the bacteria content, and then incorporating the bacteria concentrate in a carrying medium.

6. A method of producing a preparation of Lactobacillus acidophilus not containing casein by centrifuging a pure culture of the said bacteria cultivated on a milk-substratum, characterized in that the culture in the milk-substratum after having been developed to a maximum is adjusted to a pH-value of approximately 4.2–4.3, and the casein that has separated out is removed therefrom, after which the bacteria culture thus freed of casein is subjected to centrifuging in order to concentrate the bacteria content, and then incorporating the bacteria concentrate in a carrying medium.

ERIK GUNNAR MEJLBO.

REFERENCES CITED

The following references are of record in the file of this patent:

UNITED STATES PATENTS

| Number | Name | Date |
|---|---|---|
| 1,918,042 | Nitardy et al. | July 11, 1933 |
| 1,957,555 | Reichel et al. | May 8, 1934 |

OTHER REFERENCES

Fornachon et al., J. of Bact., 40, 649–655 (1940).